W. C. RASTETTER.
STEERING WHEEL.
APPLICATION FILED MAY 18, 1921.
1,420,446.
Patented June 20, 1922.
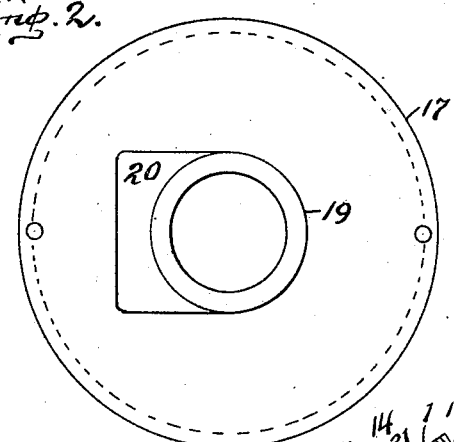
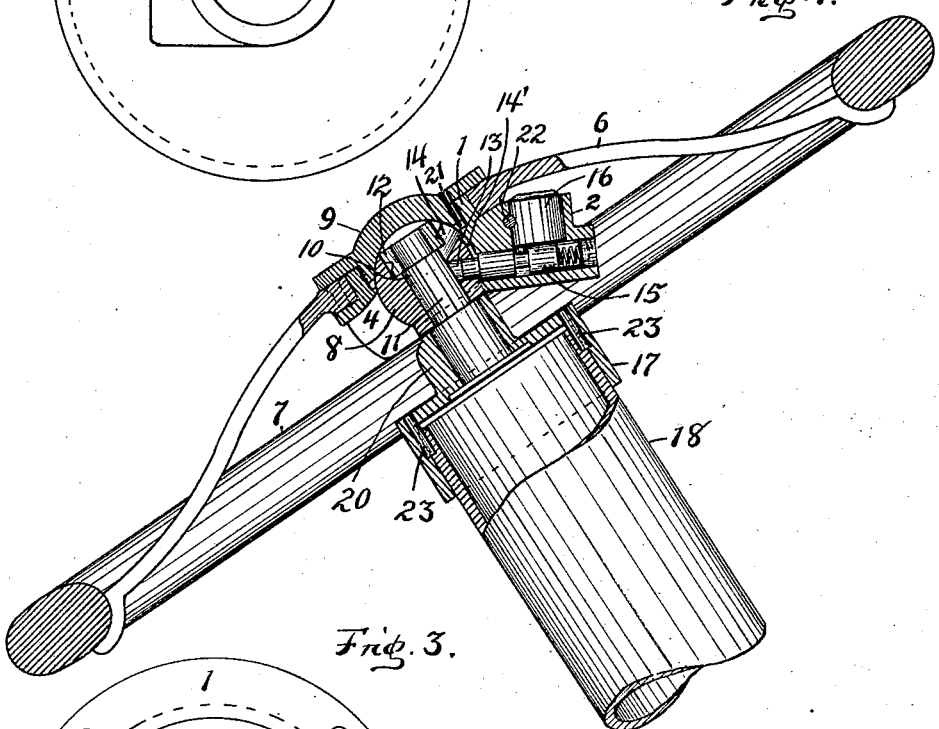
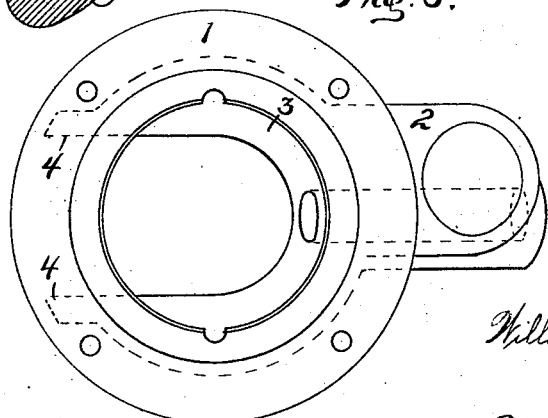
William C Rastetter
Inventor
By
H. G. Burns Attorney.

UNITED STATES PATENT OFFICE.

WILLIAM C. RASTETTER, OF FORT WAYNE, INDIANA.

STEERING WHEEL.

1,420,446.   Specification of Letters Patent.   Patented June 20, 1922.

Application filed May 18, 1921. Serial No. 470,523.

*To all whom it may concern:*

Be it known that I, WILLIAM C. RASTETTER, a citizen of the United States of America, and resident of Fort Wayne, in the county of Allen and State of Indiana, have invented certain new and useful Improvements in Steering Wheels, of which the following is a specification.

This invention relates to improvements in steering wheels for automobiles and the objects thereof are, first to provide a mount for a steering wheel that will permit of the wheel being tilted out of the way of the driver to facilitate his leaving the conveyance; and second, to provide a locking mechanism by means of which the wheel will be rendered inoperative when secured in tilted position.

These objects are accomplished by the construction illustrated in the accompanying drawings in which:—

Fig. 1 is a side elevation of the steering wheel and the steering column upon which same is mounted, there being parts broken away and in section;

Fig. 2 is a plan view, upon an enlarged scale, of the cap of the steering column including a boss formed thereon; and Fig. 3 is a plan view, also upon an enlarged scale, of the hub of the steering wheel.

Similar characters of reference indicate corresponding parts throughout the several views and referring now to the same:—

1 is a hub having a boss 2 and central chamber 3 that extends through one side of the hub opposite the boss, there being two jaws 4 oppositely disposed at the respective sides of the chamber. On the top of the hub is fixedly secured a spider 6 to which is secured the rim 7 of the steering wheel.

Within the chamber of the hub is arranged a ball 8 that is held therein by a cap 9 which is secured into the end of the hub, the cap being shaped so as to admit of the hub being tilted relative to the ball. The ball is mounted upon the upper end of a steering post 10 and is secured thereon by a key 11 and nut 12 so as to prevent its turning relative to the post. The ball has two radially disposed sockets 13 and 14, and the boss 2 has arranged therein a spring pressed bolt 15 that is adapted to enter one or the other of the sockets accordingly as the hub is tilted on the ball, there being a groove 14' in the face of the ball extending from one socket to the other that serves as a guide for the end of the bolt during the tilting movement of the hub. The boss has also fixed therein a lock 16 adapted to control engagement of the bolt 15 with the ball.

The steering post 10 is mounted in a cap 17 that is fixed on the top of the steering column 18, and the cap has an upwardly projecting sleeve 19 from one side of which extends a lug 20 which is adapted to enter and fit between the jaws 4 of the hub when in tilted position and prevent turning movement of the hub relative to the cap.

As it is the intention to construct the device as to prevent unauthorized use of an automobile equipped with the invention, the cap 9 is permanently secured to the hub by a hardened pin 21, the lock 16 is secured in the boss 2 by a hardened pin 22, and the cap 17 is secured on the steering column by hardened pins 23, the pins serving as securing means which render separation of the several parts difficult.

In using the invention the wheel is positioned so that the bolt 15 engages in the socket 13 and holds the wheel in proper relation with the post 10 for steering the automobile. By manipulating the lock 16 the bolt is disengaged from the socket 13 which permits tilting of the wheel to a position so that the bolt may enter the socket 14 and lock the wheel in tilted position. While thus held in the latter position the lug 20 extends between the jaws 4 and prevents the wheel from being turned and the steering gear of the automobile consequently ineffective.

What I claim is:—

1. In a device of the class described, a steering wheel having a chambered hub; a steering column including a cap provided with a projecting lug; a steering post extending through the cap; a ball secured on the top of the post arranged within the hub and having two radially disposed sockets; and a locking means in connection with the hub adapted to selectively engage in the sockets; said hub having jaws for engagement with the lug when the wheel is in tilted position.

2. In a steering apparatus, a steering wheel having a hub with a chamber therein that extends through one side thereof; a steering post including a ball fixed thereon and arranged within the hub; the ball having radially disposed sockets; a column including a cap through which the steering post extends and having a projecting lug adapted to have locking engagement with the hub when the steering wheel is tilted; and a locking means in connection with the hub adapted to have engagement selectively in the sockets for holding the wheel in operating and tilting positions.

3. In a steering apparatus, a column including a projecting lug in fixed relation therewith; a steering post extending from the column including a ball fixed thereon having two sockets; a steering wheel, the hub of which is positioned on the ball and so formed as to have locking engagement with the lug when the wheel is tilted; and a locking means in connection with the hub adapted to have engagement selectively in the sockets for holding the wheel in operating and tilted positions.

4. In a steering apparatus including a steering column having a projecting lug in fixed relation therewith; a steering post mounted in the column; a wheel pivotally mounted in connection with the post, the hub of the wheel being so formed as to have locking engagement with the lug when the wheel is tilted from its steering position; and a locking means in connection with the wheel for holding it in operating and tilting positions.

In testimony whereof I affix my signature, in presence of two witnesses.

WILLIAM C. RASTETTER.

Witnesses:
 MATILDA METTLER,
 WALTER G. BURNS.